US012619839B2

(12) United States Patent
Liang et al.

(10) Patent No.: US 12,619,839 B2
(45) Date of Patent: May 5, 2026

(54) LOCATING METHOD AND LOCATING SYSTEM FOR SMART SHOPPING CART, COMPUTER DEVICE AND STORAGE MEDIUM

(71) Applicant: Hanshow Technology Co., Ltd., Jiaxing (CN)

(72) Inventors: Min Liang, Jiaxing (CN); Zhe Fu, Jiaxing (CN); Xingyu Zhang, Jiaxing (CN)

(73) Assignee: Hanshow Technology Co., Ltd., Jiaxing (CN)

( * ) Notice: Subject to any disclaimer, the term of this patent is extended or adjusted under 35 U.S.C. 154(b) by 0 days.

(21) Appl. No.: 19/050,944

(22) Filed: Feb. 11, 2025

(65) Prior Publication Data

US 2025/0181852 A1      Jun. 5, 2025

Related U.S. Application Data

(63) Continuation of application No. 18/825,629, filed on Sep. 5, 2024, now Pat. No. 12,254,374.

(30) Foreign Application Priority Data

Nov. 13, 2023     (CN) .......................... 202311505182.3

(51) Int. Cl.
*G06K 7/10*          (2006.01)
*G01S 5/02*          (2010.01)
(52) U.S. Cl.
CPC ...... *G06K 7/10297* (2013.01); *G01S 5/02524* (2020.05); *G01S 2205/02* (2020.05)
(58) Field of Classification Search
CPC ............ G06K 7/10297; G01S 5/02524; G01S 2205/02

(Continued)

(56) References Cited

U.S. PATENT DOCUMENTS 12,254,374 B1 *   3/2025   Liang ...................... H04W 4/35
2011/0106624 A1    5/2011   Bonner et al.
(Continued)

FOREIGN PATENT DOCUMENTS

AU          2024205681 A1     5/2025
CN            105373907 A      3/2016
(Continued)

OTHER PUBLICATIONS

Ding et al., "Design and implementation of customer positioning system based on ESLS" Computer Engineering and Applications, vol. 54, No. 11, Jun. 1, 2018, 6 pages. [English abstract included].

(Continued)

*Primary Examiner* — Daniel A Hess
(74) *Attorney, Agent, or Firm* — Hanley, Flight & Zimmerman, LLC

(57)          ABSTRACT

The present disclosure provides a locating method and a locating system for a smart shopping cart, a computer device and a storage medium. The method includes: constructing a locating fingerprint database of an smart shopping cart based on commodity attributes collected by an intelligent device and shelf label heartbeat signals received by a communication module; when a motion sensor obtains the motion data of the shopping cart body, the communication module sends all shelf label heartbeat signals received within a second preset time window to a server; the server matches all the shelf label heartbeat signals received within the second preset time window with the locating fingerprint database to obtain locating information of the smart shopping cart.

20 Claims, 9 Drawing Sheets

(58) Field of Classification Search

USPC .......................................................... 235/375

See application file for complete search history.

(56) References Cited

U.S. PATENT DOCUMENTS

| | | |
|---|---|---|
| 2011/0240731 A1 | 10/2011 | Lee |
| 2014/0343846 A1 | 11/2014 | Goldman et al. |
| 2018/0257688 A1 | 9/2018 | Carter et al. |
| 2020/0367033 A1 | 11/2020 | Ganz et al. |
| 2021/0282033 A1 | 9/2021 | Lai et al. |
| 2021/0287193 A1 | 9/2021 | Wu et al. |
| 2022/0051310 A1 | 2/2022 | Graube et al. |
| 2022/0292274 A1 | 9/2022 | Hou et al. |
| 2023/0209623 A1 | 6/2023 | Huang et al. |

FOREIGN PATENT DOCUMENTS

| | | |
|---|---|---|
| CN | 108616811 A | 10/2018 |
| CN | 109951483 A | 6/2019 |
| CN | 111182449 A | 5/2020 |
| CN | 211831165 U | 10/2020 |
| CN | 112351479 A | 2/2021 |
| CN | 112801241 A | 5/2021 |
| CN | 114339981 A | 4/2022 |
| CN | 115063078 A | 9/2022 |
| CN | 116908781 A | 10/2023 |
| EP | 4554258 A1 | 5/2025 |
| JP | 2014507690 A | 3/2014 |
| JP | 2022532058 A | 7/2022 |
| JP | 2022544254 A | 10/2022 |
| WO | 2021003595 A1 | 1/2021 |
| WO | 2022262790 A1 | 12/2022 |

OTHER PUBLICATIONS

Wang et al., "Leveraging Logical Anchor into Topology Optimization for Indoor Wireless Fingerprinting," Computers Materials & Continua, vol. 58, No. 2, Feb. 15, 2019, 13 pages.

The State Intellectual Property Office of People's Republic of China, "First Office Action," issued in connection with Chinese Patent Application No. 202311505182.3, dated Dec. 26, 2023, 7 pages. [English translation included].

China National Intellectual Property Administraton, "First Search Report," issued in connection with Chinese Patent Application No. 202311505182.3, dated Dec. 26, 2023, 8 pages. [English translation included].

China National Intellectual Property Administraton, "Supplemental Search Report," issued in connection with Chinese Patent Application No. 202311505182.3, dated Jan. 15, 2024, 4 pages. [English translation included].

United States Patent and Trademark Office, "Notice of Allowance and Fee(s) Due," issued in connection with U.S. Appl. No. 18/825,629, dated Nov. 20, 2024, 12 pages.

Japan Patent Office, "Notice for Grant," issued in connection with JP Patent Application NO. 2024-193424 on Jan. 14, 2025, 4 pages. [English language machine translation included.]

European Patent Office, "Extended European Search Report," issued in connection with EP Patent Application No. 24193622.8 on Jan. 24, 2025, 6 pages.

IP Australia, "Examination Report" issued on Mar. 21, 2025 in connection with Australian Patent Application No. 2024205681, 8 pages.

Yassin, Ali et al., "Recent Advances in Indoor Localization: A Survey on Theoretical Approaches and Applications", IEEE Communications Surveys & Tutorials, vol. 19, No. 2, Second Quarter 2017, 20 pages.

Canadian Patent Office, "The First Office Action and Search Report," issued in connection with Canadian Patent Application No. 3248175, dated Aug. 11, 2025, 6 pages.

European Patent Office, "The First Office Action," issued in connection with European Patent Application No. 24193622.8, issued on Dec. 12, 2025, 5 pages.

* cited by examiner

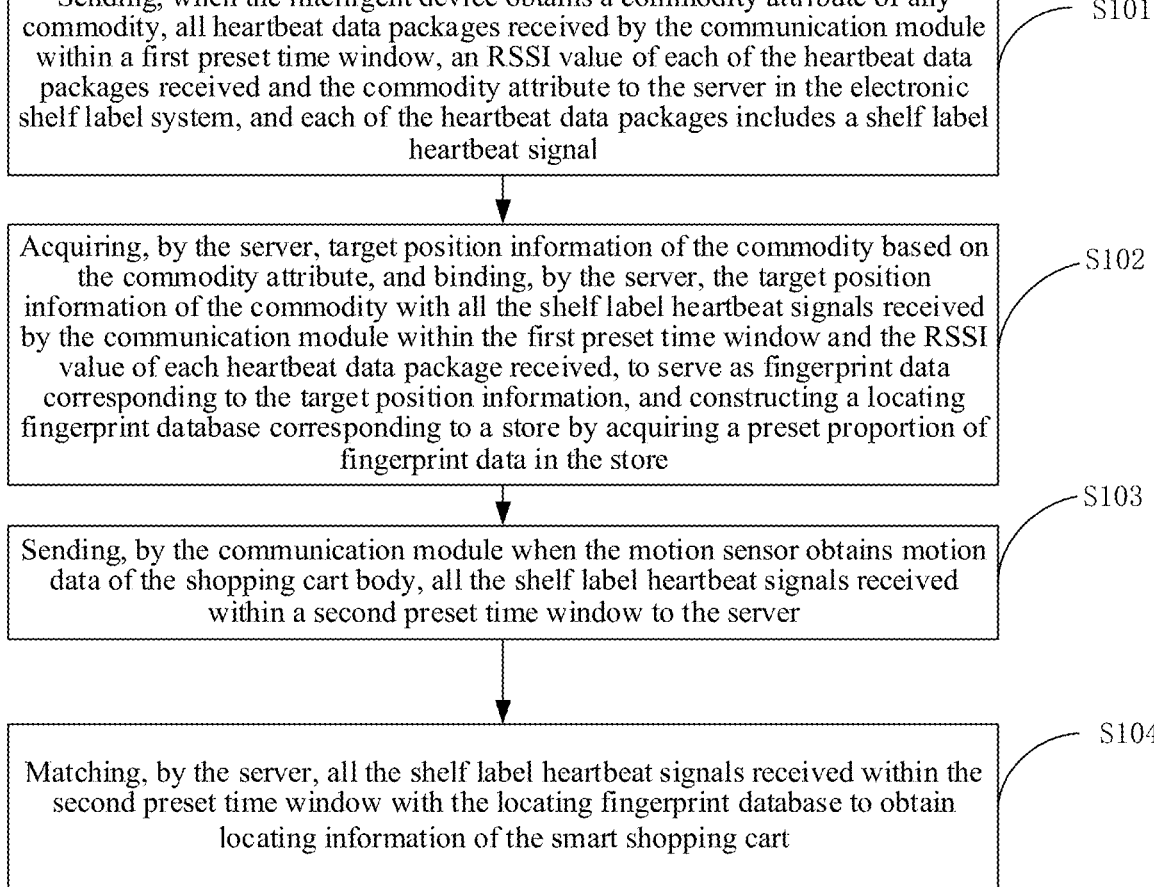

Sending, when the intelligent device obtains a commodity attribute of any commodity, all heartbeat data packages received by the communication module within a first preset time window, an RSSI value of each of the heartbeat data packages received and the commodity attribute to the server in the electronic shelf label system, and each of the heartbeat data packages includes a shelf label heartbeat signal — S101

Acquiring, by the server, target position information of the commodity based on the commodity attribute, and binding, by the server, the target position information of the commodity with all the shelf label heartbeat signals received by the communication module within the first preset time window and the RSSI value of each heartbeat data package received, to serve as fingerprint data corresponding to the target position information, and constructing a locating fingerprint database corresponding to a store by acquiring a preset proportion of fingerprint data in the store — S102

Sending, by the communication module when the motion sensor obtains motion data of the shopping cart body, all the shelf label heartbeat signals received within a second preset time window to the server — S103

Matching, by the server, all the shelf label heartbeat signals received within the second preset time window with the locating fingerprint database to obtain locating information of the smart shopping cart — S104

FIG. 1

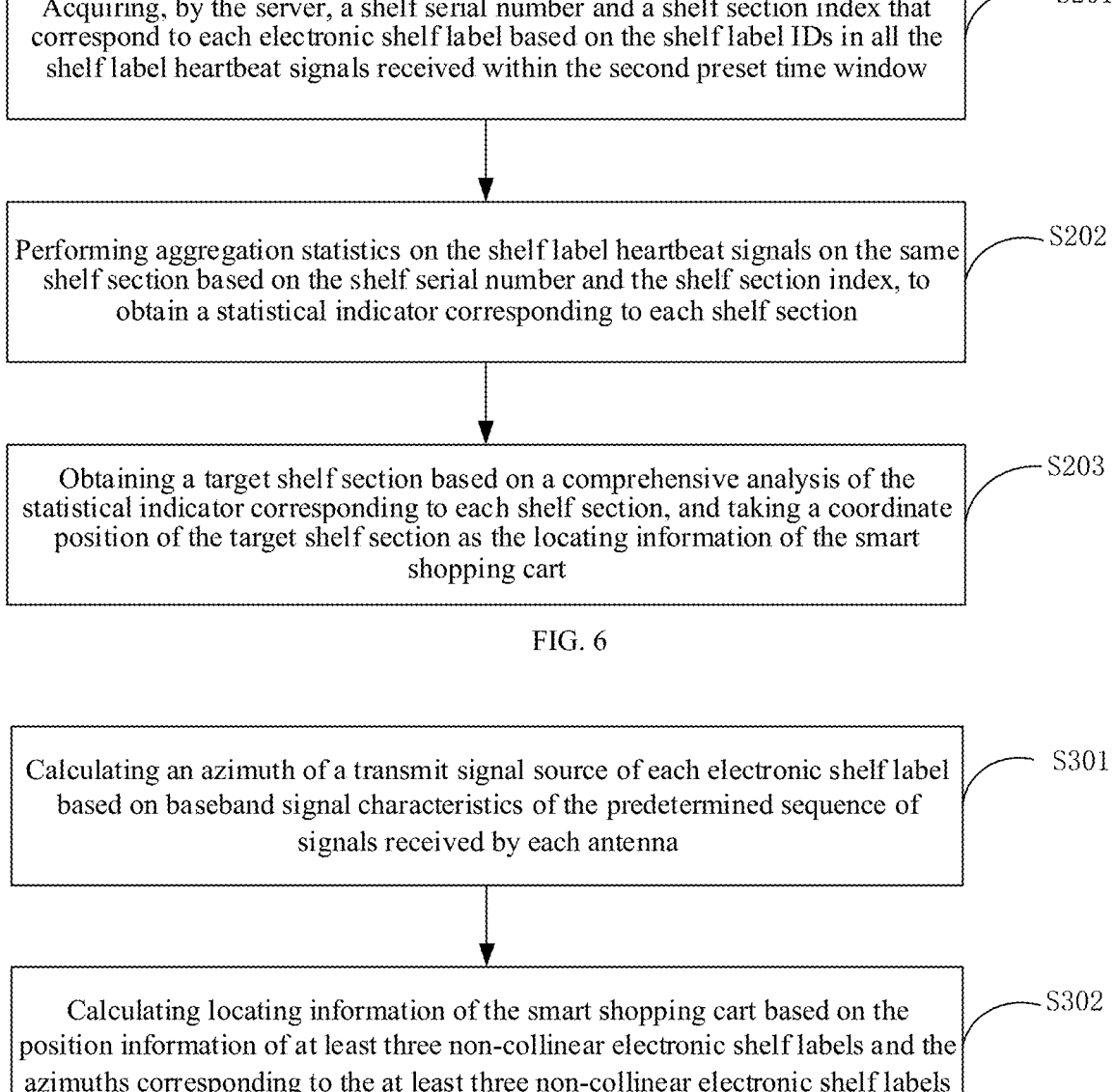

Acquiring, by the server, a shelf serial number and a shelf section index that correspond to each electronic shelf label based on the shelf label IDs in all the shelf label heartbeat signals received within the second preset time window — S201

Performing aggregation statistics on the shelf label heartbeat signals on the same shelf section based on the shelf serial number and the shelf section index, to obtain a statistical indicator corresponding to each shelf section — S202

Obtaining a target shelf section based on a comprehensive analysis of the statistical indicator corresponding to each shelf section, and taking a coordinate position of the target shelf section as the locating information of the smart shopping cart — S203

FIG. 6

Calculating an azimuth of a transmit signal source of each electronic shelf label based on baseband signal characteristics of the predetermined sequence of signals received by each antenna — S301

Calculating locating information of the smart shopping cart based on the position information of at least three non-collinear electronic shelf labels and the azimuths corresponding to the at least three non-collinear electronic shelf labels — S302

FIG. 7

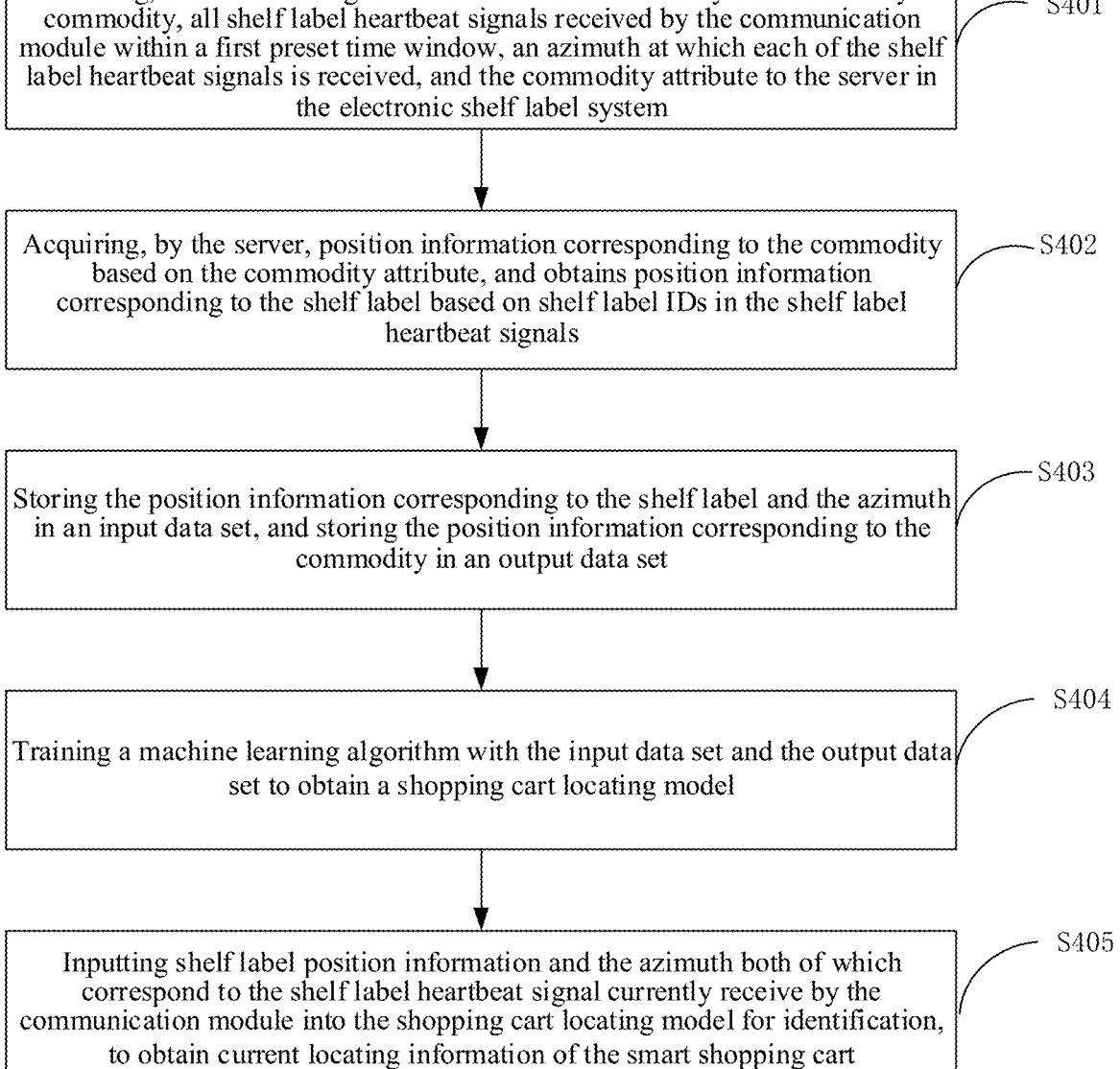

Sending, when the intelligent device obtains a commodity attribute of any commodity, all shelf label heartbeat signals received by the communication module within a first preset time window, an azimuth at which each of the shelf label heartbeat signals is received, and the commodity attribute to the server in the electronic shelf label system — S401

Acquiring, by the server, position information corresponding to the commodity based on the commodity attribute, and obtains position information corresponding to the shelf label based on shelf label IDs in the shelf label heartbeat signals — S402

Storing the position information corresponding to the shelf label and the azimuth in an input data set, and storing the position information corresponding to the commodity in an output data set — S403

Training a machine learning algorithm with the input data set and the output data set to obtain a shopping cart locating model — S404

Inputting shelf label position information and the azimuth both of which correspond to the shelf label heartbeat signal currently receive by the communication module into the shopping cart locating model for identification, to obtain current locating information of the smart shopping cart — S405

FIG. 14

LOCATING METHOD AND LOCATING SYSTEM FOR SMART SHOPPING CART, COMPUTER DEVICE AND STORAGE MEDIUM

CROSS-REFERENCE TO RELATED APPLICATIONS

This application is a continuation of U.S. patent application Ser. No. 18/825,629, filed on Sep. 5, 2024, which claims priority to Chinese Patent Application No. 202311505182.3, filed on Nov. 13, 2023, both of which are hereby incorporated by reference their entireties.

TECHNICAL FIELD

The present disclosure relates to the field of locating technology, and particularly to a locating method and a locating system for smart shopping cart, a computer device and a storage medium.

BACKGROUND

At present, large supermarkets around the world are carrying out digital upgrading and transformation. In the digital applications, electronic shelf labels will replace the traditional paper labels. In addition to displaying ordinary information, electronic shelf labels can also be used in many applications, such as quick picking, out-of-stock management, quick inventory and man-machine interaction for users. Regarding a shopping cart walking in a shelf area, it is usually necessary to locate the shopping cart to provide a navigation thereof and a service recommendation based on the position of the shopping cart.

At present, the Bluetooth locating technology is usually used for the locating of the shopping cart. In order to cover all the shelf aisles in large supermarkets, a large number of Bluetooth beacons need to be deployed, which leads to the problems of complicated installation and high maintenance cost.

SUMMARY

Aiming at the disadvantages in the prior art, the present disclosure provides a locating method and a locating system for a smart shopping cart, a computer device and a storage medium, which solve the problems of complicated installation and high maintenance cost in the shopping cart locating method in the prior art. The present disclosure realizes a fingerprint locating method for the shopping cart based on an electronic shelf label system applied in a store, thereby reducing the hardware installation complexity of the locating technology and reducing maintenance cost thereof, and improving the locating accuracy and stability.

In a first aspect, the present disclosure provides a locating method for a smart shopping cart, which is applied to a smart shopping cart in a store having an electronic shelf label system, and the electronic shelf label system includes a server and an electronic shelf label which has known position information and sends heartbeat data package; the smart shopping cart includes a shopping cart body, and a communication module provided on the shopping cart body and configured to receive the heartbeat data package, a motion sensor provided on the shopping cart body and configured to collect motion data, and an intelligent device provided on the shopping cart body and configured to collect a commodity attribute, the method includes: sending, when the intelligent device obtains a commodity attribute of any commodity, all heartbeat data packages received by the communication module within a first preset time window, an RSSI value of each of the heartbeat data packages received and the commodity attribute to the server in the electronic shelf label system, and each of the heartbeat data packages includes a shelf label heartbeat signal; acquiring, by the server, target position information of the commodity based on the commodity attribute, and binding the target position information of the commodity with all the shelf label heartbeat signals received by the communication module within the first preset time window and the RSSI value of each of the heartbeat data packages received, to serve as fingerprint data corresponding to the target position information; and constructing a locating fingerprint database corresponding to a store by acquiring a preset proportion of fingerprint data in the store; sending, by the communication module; sending, by the communication module when the motion sensor obtains motion data of the shopping cart body, all the shelf label heartbeat signals received within a second preset time window to the server; and matching, by the server, all the shelf label heartbeat signals received within the second preset time window with the locating fingerprint database to obtain locating information of the smart shopping cart.

Optionally, the shelf label heartbeat signal includes a shelf label ID and a report time; the fingerprint data corresponding to the target position information includes a plurality of shelf label IDs and an RSSI weighted average corresponding to each shelf label ID.

Optionally, the first preset time window=T1+T2+T3, where T1 is a duration before the intelligent device obtains the commodity attribute, T2 is a duration after the intelligent device obtains the commodity attribute and before the shopping cart starts to move, and T3 is a duration after the shopping cart starts to move; and the second preset time window T4, where T4 is a duration before the motion sensor obtains the motion data.

Optionally, the acquiring, by the server, target position information of the commodity based on the commodity attribute includes: if the server acquires a plurality of position information based on the commodity attribute, filtering the plurality of position information based on the locating information of the shopping cart at a previous moment to obtain the target position information of the commodity.

Optionally, after the locating fingerprint database corresponding to the store is constructed, the method further includes: acquiring fingerprint data corresponding to a position of the commodity when the intelligent device continues to obtain the commodity attribute; and updating the locating fingerprint database with the fingerprint data corresponding to the position of the commodity.

Optionally, before the locating fingerprint database corresponding to the store is constructed, the method further includes: acquiring, by the server, a shelf serial number and a shelf section index that correspond to each electronic shelf label based on shelf label IDs in all the shelf label heartbeat signals received within the second preset time window; performing aggregation statistics on the shelf label heartbeat signals on the same shelf section based on the shelf serial number and the shelf section index, to obtain a statistical indicator corresponding to each shelf section; and obtaining a target shelf section based on a comprehensive analysis of the statistical indicator corresponding to each shelf section, and taking a coordinate position of the target shelf section as the locating information of the smart shopping cart.

Optionally, when the communication module includes a plurality of antennas and the heartbeat data package further includes a preset sequence of signals, before the locating fingerprint database corresponding to the store is constructed, the method further includes: calculating an azimuth of a transmit signal source of each electronic shelf label based on baseband signal characteristics of the preset sequence of signals received by each antenna; and calculating the locating information of the smart shopping cart based on the position information of at least three non-collinear electronic shelf labels and the azimuths corresponding to the at least three non-collinear electronic shelf labels.

Optionally, when the communication module includes a plurality of antennas and the heartbeat data package further includes a preset sequence of signals, after the matching, by the server, all the shelf label heartbeat signals received within the second preset time window with the locating fingerprint database to obtain locating information of the smart shopping cart, the method further includes: calculating the azimuth of a transmit signal source of each electronic shelf label based on baseband signal characteristics of the preset sequence of signals receive by each antenna; and revising the locating information of the smart shopping cart based on the azimuth to obtain the target locating information of the smart shopping cart.

Optionally, when the communication module includes a plurality of antennas and the heartbeat data package further includes a preset sequence of signals, the method further includes: sending, when the intelligent device obtains the commodity attribute of any commodity, all the shelf label heartbeat signals received by the communication module within the first preset time window, an azimuth at which each of the shelf label heartbeat signals is received, and the commodity attribute to the server in the electronic shelf label system; acquiring, by the server, position information corresponding to the commodity based on the commodity attribute, and obtaining position information corresponding to the shelf label based on shelf label IDs in the shelf label heartbeat signal; storing the position information corresponding to the shelf label and the azimuth in an input data set, and storing the position information corresponding to the commodity in an output data set; training a machine learning algorithm with the input data set and the output data set to obtain a shopping cart locating model; and inputting shelf label position information and the azimuth both of which correspond to the shelf label heartbeat signal currently receive by the communication module into the shopping cart locating model for identification, to obtain current locating information of the smart shopping cart.

In a second aspect, the present disclosure provides a locating system for a smart shopping cart, including an electronic shelf label which has known position information, a server and an smart shopping cart, in which the smart shopping cart includes a shopping cart body, and a communication module provided on the shopping cart body and configured to receive a heartbeat data package, a motion sensor provided on the shopping cart body and configured to collect motion data, and an intelligent device provided on the shopping cart body and configured to collect a commodity attribute; the electronic shelf label is configured to send a heartbeat data package, in which the heartbeat data package includes a shelf label heartbeat signal; the communication module is configured to send, when the intelligent device obtains a commodity attribute of any commodity, all the heartbeat data packages received within a first preset time window and the commodity attribute to the server in an electronic shelf label system; the server is configured to acquire target position information of the commodity based on the commodity attribute, and bind the target position information of the commodity with all the shelf label heartbeat signals received by the communication module within the first preset time window, to serve as fingerprint data corresponding to the target position information, and construct a locating fingerprint database corresponding to a store by acquiring a preset proportion of fingerprint data in the store; the communication module is further configured to send, when the motion sensor obtains the motion data of the shopping cart body, all the shelf label heartbeat signals received within a second preset time window to the server; and the server is further configured to match all the shelf label heartbeat signals received within the second preset time window with the locating fingerprint database to obtain locating information of the smart shopping cart.

In a third aspect, the present disclosure provides a computer device, including a memory, a processor and a computer program stored in the memory and executable in the processor, and when executing the computer program, the processor implements the steps of: sending, when the intelligent device obtains a commodity attribute of any commodity, all heartbeat data packages received by the communication module within a first preset time window, an RSSI value of each of the heartbeat data packages received and the commodity attribute to the server in the electronic shelf label system, and each of the heartbeat data packages includes a shelf label heartbeat signal; acquiring, by the server, target position information of the commodity based on the commodity attribute, and binding the target position information of the commodity with all the shelf label heartbeat signals received by the communication module within the first preset time window and the RSSI value of each of the heartbeat data packages received, to serve as fingerprint data corresponding to the target position information; and constructing a locating fingerprint database corresponding to a store by acquiring a preset proportion of fingerprint data in the store; sending, by the communication module when the motion sensor obtains motion data of the shopping cart body, all the shelf label heartbeat signals received within a second preset time window to the server; and matching, by the server, all the shelf label heartbeat signals received within the second preset time window with the locating fingerprint database to obtain locating information of the smart shopping cart.

In a fourth aspect, the present disclosure provides a readable storage medium storing a computer program, and when executed by a processor, the computer program implements the steps of: sending, when the intelligent device obtains a commodity attribute of any commodity, all heartbeat data packages received by the communication module within a first preset time window, an RSSI value of each of the heartbeat data packages received and the commodity attribute to the server in the electronic shelf label system, and each of the heartbeat data packages includes a shelf label heartbeat signal; acquiring, by the server, target position information of the commodity based on the commodity attribute, and binding the target position information of the commodity with all the shelf label heartbeat signals received by the communication module within the first preset time window and the RSSI value of each of the heartbeat data packages received, to serve as fingerprint data corresponding to the target position information; and constructing a locating fingerprint database corresponding to a store by acquiring a preset proportion of fingerprint data in the store; sending, by the communication module when the motion sensor obtains motion data of the shopping cart body, all the shelf label heartbeat signals received within a second preset time window to the server; and matching, by the server, all the shelf label heartbeat signals received within the second preset time window with the locating fingerprint database to obtain locating information of the smart shopping cart.

Compared with the prior art, the present disclosure has the following advantageous effects:

Based on the electronic shelf label system applied in the store, the present disclosure constructs a locating fingerprint database including fingerprint data corresponding to each of commodity positions, through the commodity attribute collected by the intelligent device provided on the shopping cart and the shelf label heartbeat signals received by the communication module provided on the shopping cart; and when the shopping cart is located, the collected shelf label heartbeat signals are matched with the locating fingerprint database to realize real-time locating of the shopping cart. Therefore, the present disclosure realizes a fingerprint locating method for the shopping cart based on the electronic shelf label system applied in the store, reduces the hardware installation complexity of the locating technology, reduces maintenance cost thereof, and improves the locating accuracy and stability, thereby achieving a wide application range.

BRIEF DESCRIPTION OF THE DRAWINGS

FIG. 1 illustrates a flowchart of a first locating method for a smart shopping cart according to an embodiment of the present disclosure;

FIG. 6 illustrates a flowchart of a second locating method for a smart shopping cart according to an embodiment of the present disclosure;

FIG. 7 illustrates a flowchart of a third locating method for a smart shopping cart according to an embodiment of the present disclosure;

FIG. 14 illustrates a flowchart of a fourth locating method for a smart shopping cart according to an embodiment of the present disclosure.

DESCRIPTION OF THE EMBODIMENTS

In order that the objectives, technical solutions and advantages of the embodiments of the present disclosure are clearer, the technical solutions in the embodiments of the present disclosure will be clearly and completely described below with reference to the drawings for the embodiments of the present disclosure. Obviously, those described are only a part, rather than all, of the embodiments of the present disclosure. Based on the embodiments of the present disclosure, any other embodiment obtained by those of ordinary skill in the art without paying inventive labor should fall within the protection scope of the present disclosure.

In a first aspect, the present disclosure provides a locating method for a smart shopping cart, which specifically includes the following embodiments:

Embodiment 1

FIG. 1 illustrates a flowchart of a first locating method for a smart shopping cart according to an embodiment of the present disclosure. As illustrated in FIG. 1, the method includes the following steps.

Step S101: sending, when the intelligent device obtains a commodity attribute of any commodity, all heartbeat data packages received by the communication module within a first preset time window, an RSSI value of each of the heartbeat data packages received and the commodity attribute to the server in the electronic shelf label system, and each of the heartbeat data packages includes a shelf label heartbeat signal.

Figure 2:
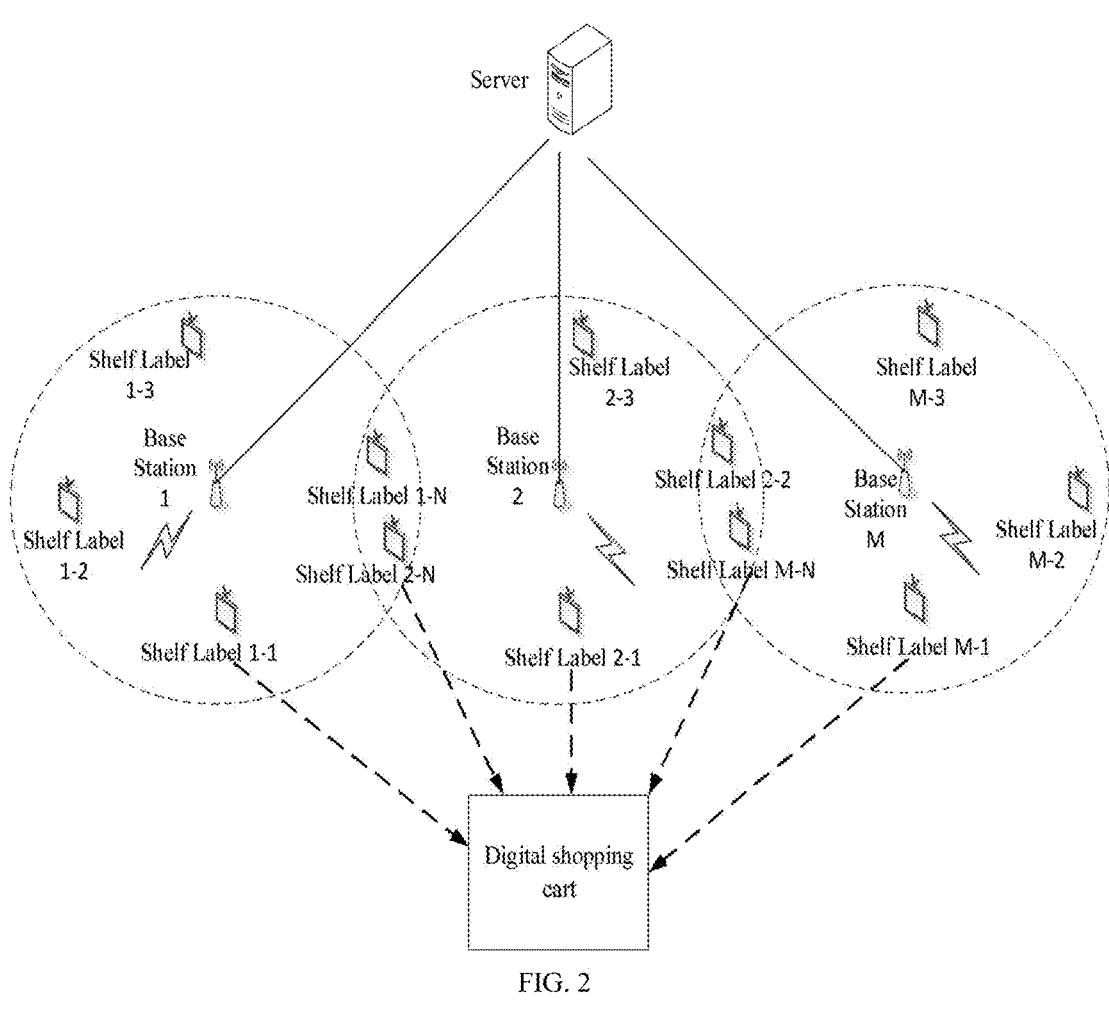
FIG. 2 illustrates a schematic diagram of a structure of an electronic shelf label system according to an embodiment of the present disclosure.

It should be noted that the locating method for the smart shopping cart according to the present embodiment is applied to a smart shopping cart in a store having an electronic shelf label system, and the electronic shelf label system includes a server and an electronic shelf label which has known position information and sends a heartbeat data package; and the electronic shelf label system further includes base stations as illustrated in FIG. 2, an electronic shelf label is communicated with the server through the base station, and during the construction of the electronic shelf label system, each of the electronic shelf labels in the store has been located in the accuracy of a shelf level based on a neighbor learning locating algorithm in the prior art, that is, the position information of each electronic shelf label in the present embodiment is known; the server in FIG. 2 stores the position information of each of the electronic shelf labels, and locates the electronic shelf label and the smart shopping cart by using neighbor data and heartbeat data; the server further manages the behavior of the electronic shelf label through the base station, and the base station is directly connected to the electronic shelf label and is responsible for the transmission of messages and data; the electronic shelf label broadcasts heartbeats regularly, conducts routine inspection (for example neighbor signal inspection) after receiving a locating instruction, and takes the obtained signal of a neighbor shelf label as neighbor information; the shopping cart may receive and cache the heartbeat of the electronic shelf label, and the cached data is used to locate when locating is required.

Figure 3:
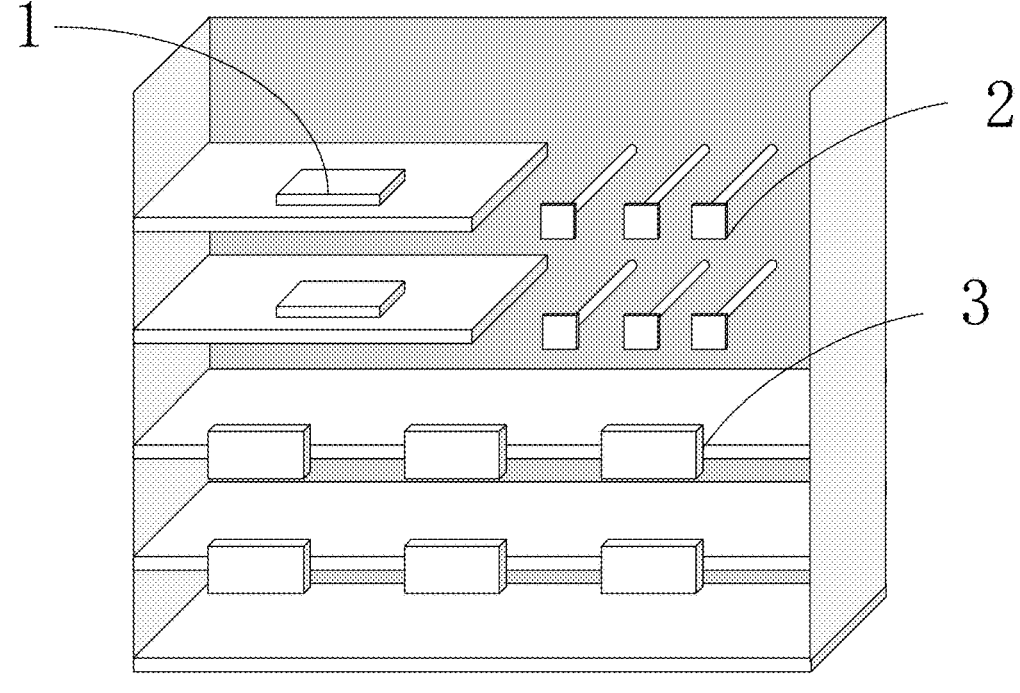
FIG. 3 illustrates a schematic diagram of a placement of an electronic shelf label according to an embodiment of the present disclosure.

The installation mode of the electronic shelf label on the shelf is illustrated in FIG. 3: 1. horizontally put on a plane;

2. hung on a hook; 3. obliquely hung on a layer board. Each of the electronic shelf labels sends heartbeat data packages at a broadcast frequency point with a certain time interval, and a 2.4 G receiving module can receive the heartbeat data packages when being configured at the broadcast frequency point.

Figure 4:
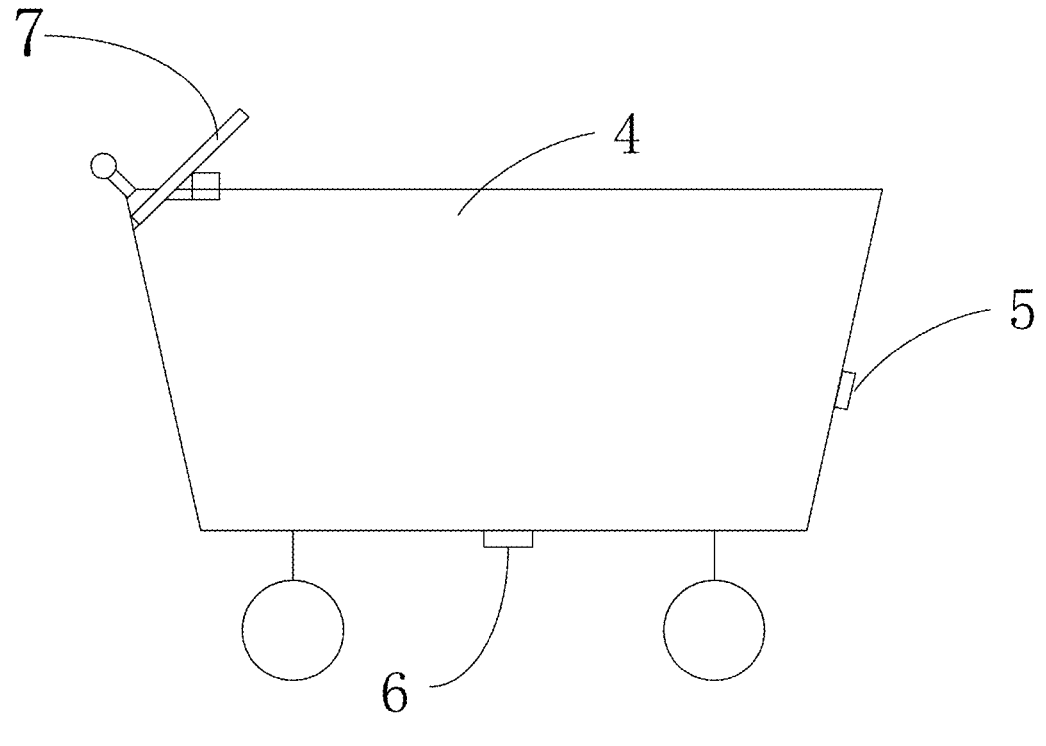
FIG. 4 illustrates a schematic diagram of a structure of a smart shopping cart according to an embodiment of the present disclosure.

As illustrated in FIG. 4, the smart shopping cart in the present embodiment includes a shopping cart body 4, and a communication module 5 provided on the shopping cart body and configured to receive the heartbeat data package, a motion sensor 6 provided on the shopping cart body and configured to collect motion data, and an intelligent device 7 provided on the shopping cart body and configured to collect a commodity attribute, and the positions of the communication module 5, the motion sensor 6 and the intelligent device 7 are not limited to those illustrated in FIG. 4; the communication module 5 is a 2.4 G communication module, and when a user pushes the shopping cart to purchase commodities in a shopping mall, the communication module can receive the heartbeat data package sent by shelf labels on surrounding shelves; the intelligent device 7 can scan a barcode of a commodity and automatically add the commodity in a purchase order, and the intelligent device 7 can be connected to a server in the background; and the motion sensor 6 can sense that the shopping cart is pushed and then upload motion information to the intelligent device.

Figure 5:
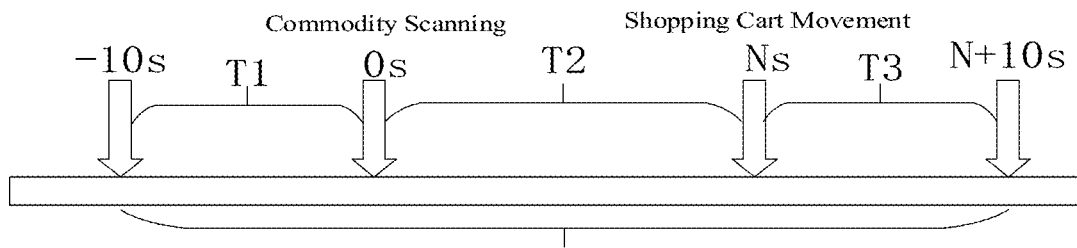
FIG. 5 illustrates a schematic diagram of a definition of a first preset time window according to an embodiment of the present disclosure.

In the present embodiment, before the fingerprint locating of the shopping cart, it is necessary to establish a fingerprint database corresponding to a store: when a customer purchases a commodity or a store worker specially collects a commodity attribute, while a barcode of the commodity is scanned by the intelligent device installed on the shopping cart, the communication module is triggered to collect heartbeat data packages sent by nearby electronic shelf labels for a period of time, and report all the heartbeat data packages and the commodity attribute to the server; in order to obtain as many heartbeat data packages as possible for determining position, the period of time is the above-mentioned first preset time window, the definition of the first preset time window is illustrated in FIG. 5, i.e., the first preset time window=T1+T2+T3, where T1 is a duration before the intelligent device obtains the commodity attribute, T2 is a duration after the intelligent device obtains the commodity attribute and before the shopping cart starts to move, and T3 is a duration after the shopping cart starts to move, and T2 is the duration that the shopping cart stays in place after the intelligent device has scanned the commodity, and if the shopping cart does not stay after the commodity has been scanned, the duration T2 is 0; in the present embodiment, the values of the T1 and the T3 are 10 seconds, respectively; that is, the obtained heartbeat data packages consist of three parts: a first part is heartbeat data packages received in first 10 s (i.e., 10 seconds) before the scanning of the commodity is triggered, a second part is heartbeat data packages received in Ns (i.e., N seconds) between the start of triggering the scanning of the commodity and the motion sensor detecting that the shopping cart moves again, and a third part is heartbeat data packages received in 10 s (i.e., 10 seconds) after the shopping cart moves again; and each of the heartbeat data packages includes a shelf label heartbeat signal.

In the present embodiment, the shelf label heartbeat signal includes a shelf label ID and report time, and the shelf label sets a heartbeat sending power at 0 dbm in order to ensure the normal screen-refreshing task. For the locating of the shopping cart, this setting mode leads to the collection of long-distance shelf labels by the shopping cart, thereby affecting the construction of the fingerprint database. Thus, before reporting the data, the intelligent device will set a threshold to filter RSSI values of the received shelf label heartbeat signals, and only when the signal strength exceeds the threshold, i.e., the corresponding shelf label is ensured to be in a short distance, the heartbeat thereof can be reported to the server.

Step S102: acquiring, by the server, target position information of the commodity based on the commodity attribute, and binding, by the server, the target position information of the commodity with all the shelf label heartbeat signals received by the communication module within the first preset time window and the RSSI value of each heartbeat data package received, to serve as fingerprint data corresponding to the target position information, and constructing a locating fingerprint database corresponding to a store by acquiring a preset proportion of fingerprint data in the store.

In the present embodiment, the server determines the target position information of the commodity based on the received commodity attribute, and the target position information is determined by a binding relationship between the commodity and the shelf label, that is, the position information of the bound electronic shelf label is taken as the target position information; next, the server binds the target position information with all the shelf label heartbeat signals received within the first preset time window, to obtain the fingerprint data corresponding to the target position information; it should be noted that among the heartbeat signals corresponding to the target position information, there are multiple heartbeat signals received from a same electronic shelf label, and the RSSI values of these received heartbeat signals may be the same or different, so it is necessary to take a weighted average of the RSSI values of these multiple heartbeat signals received from the same electronic shelf label based on the shelf label IDs, and then the fingerprint data corresponding to the target position information includes the shelf label ID and the weighted average of the RSSI values. When a preset proportion of fingerprint data is acquired, it means that the construction of the locating fingerprint database is completed, and the preset proportion may be any proportion such as 70% or 80% of the total fingerprint data.

It should be noted that during the fingerprint locating of the shopping cart, the whole store will be divided into several squares. In this scenario, after the user scans a commodity, the position of the commodity is corresponding to one of the squares. The construction of the locating fingerprint database has the following characteristics:

(1) It is necessary to set a time threshold, and only the heartbeat data within the time threshold is used to construct fingerprints, so as to prevent the credibility of the fingerprint database from being affected by the shelf label being moved. The heartbeat data within the time threshold needs to be divided into several parts based on the time at which heartbeat data is acquired, and the heartbeat data that is acquired at a time closer to the current time has a higher credibility. Corresponding weight is assigned to each of the heartbeat data based on the following formula:

$$
weight = \begin{cases} x, & \text{if } t_c - t_r \leq 1 \times \dfrac{t}{x} \\ x-1, & \text{if } 1 \times \dfrac{t}{x} < t_c - t_r \leq 2 \times \dfrac{t}{x} \\ \cdots \\ 1, & \text{if } (x-1) \times \dfrac{t}{x} < t_c - t_r \leq t \\ 0, & \text{if } t_c - t_r > t \end{cases}
$$

where, x represents the number of assigned time parts and also a maximum value of the weight, t represents a time threshold, $t_c$ represents a current time, and $t_r$ represents a report time of the heartbeat data package.

The weighted average of RSSI values of the same shelf label corresponding to a single position in the fingerprint database may be calculated according to the following formula:

$$RSSI_{w\_avg} = \frac{\sum_{i=0}^{n} w_i \times RSSI_i}{\sum_{i=0}^{n} w_i}$$

where, $RSSI_{w\_avg}$ represents a weighted average of the RSSI values of the corresponding shelf label at the corresponding position in the fingerprint database, $w_i$ represents a weight corresponding to an i-th heartbeat data, and the $RSSI_i$ represents an RSSI value corresponding to the i-th heartbeat data.

If the heartbeat data of the same shelf label are received from the same position for multiple times during fingerprint matching, the weighted average of the heartbeat data may also be calculated using the formula.

During the calculation of the fingerprint similarity, a Euclidean distance may be used:

$$Distance = \sqrt{\sum_{i=0}^{n} (RSSI_{w\_avg\_i} - RSSI_{RX\_i})^2}$$

where, n represents a weighted average of n shelf labels in an area, $RSSI_{RX\_i}$ represents the RSSI value of the shelf label currently received, and the similarity decreases as the distance increases.

(2) The fingerprint data of a position consists of three parts, i.e., <the shelf label ID, the RSSI value and the report time>, which are filtered based on the time threshold, and finally the fingerprint data used to construct the fingerprint database includes the shelf label ID and the weighted average of the RSSI values.

(3) The fingerprint database is constantly updated as the users continue to collect the commodities.

(4) The fingerprint database includes two dimensions, i.e., the fingerprint at a single position and the whole-store fingerprints: 1) for the fingerprint at a single position, there may be several commodities bound to the position; and only when the commodities obtained at the position exceed a certain proportion or a certain quantity can the position be considered as credible; 2) for the whole-store fingerprints, when the credible positions exceeds a certain proportion, it is considered that the whole-store fingerprints are substantially constructed.

(5) If there is no fingerprint at a position, the shopping cart cannot be located at that position.

It should be noted that for the weights of the heartbeat data, according to the actual scenario, it is possible to make the weights equal to 1 within the time threshold t and equal to 0 beyond the time threshold t. At this time, the weighted average of the RSSI values is the average of the RSSI values:

$$RSSI_{w\_avg} = \frac{\sum_{i=0}^{n} RSSI_i}{n}$$

The Weight formula may be adjusted according to the actual situation.

It should be noted that during the calculation of the fingerprint similarity, according to the actual scenario, other calculation modes may be used in addition to the Euclidean distance, such as:

Manhattan distance: $Distance = \sum_{i=0}^{n} |RSSI_{w\_avg\_i} - RSSI_{RX\_i}|$ Chebyshev distance: $Distance = \max_{i} (RSSI_{w\_avg\_i} - RSSI_{RX\_i})$.

In another embodiment of the present disclosure, after the locating fingerprint database corresponding to the store is constructed, the method further includes: acquiring fingerprint data corresponding to a position of the commodity when the intelligent device continues to obtain the commodity attribute; and updating the locating fingerprint database with the fingerprint data corresponding to the position of the commodity.

It should be noted that updating the locating fingerprint database includes adding fingerprint data and updating the constructed fingerprint data.

In still another embodiment of the present disclosure, the acquiring, by the server, target position information of the commodity based on the commodity attribute includes: if the server acquires a plurality of position information based on the commodity attribute, filtering the plurality of position information based on the locating information of the shopping cart at a previous moment to obtain the target position information of the commodity.

It should be noted that during the actual operation of the store, one commodity may be placed in multiple places, and for example, the laundry detergent may be placed on a normal category storage shelf and may also be placed in a promotion area, such that the scanned commodity attribute corresponds to multiple positions of the store. Therefore, when the server obtains a plurality of position information based on the commodity attribute, the plurality of position information is filtered based on the locating information of the shopping cart at the previous moment to obtain the target position information of the commodity, that is, the position information closest to the locating information at the previous moment among the plurality of position information is taken as the target position information.

Step S103: sending, by the communication module when the motion sensor obtains motion data of the shopping cart body, all the shelf label heartbeat signals received within a second preset time window to the server; and Step S104: matching, by the server, all the shelf label heartbeat signals received within the second preset time window with the locating fingerprint database to obtain locating information of the smart shopping cart.

In this embodiment, the second preset time window is T4 that is a duration before the motion sensor collects the motion data.

It should be noted that after the locating fingerprint database corresponding to the store is constructed, the real-time locating function for the shopping cart can be triggered by pushing the shopping cart. When the motion sensor obtains the motion data of the shopping cart body, the intelligent device on the shopping cart can send all the shelf label heartbeat signals received in the latest window to the server, and the server may locate the shopping cart in real time by using a big data matching method or a machine learning algorithm.

In an implementation of the present embodiment, the big data matching method is a fingerprint locating method based on traditional Bayes. A signal vector m=(<esl_id1, rssi_avg1>, <esl_id2, rssi_avg2>, . . . , <esl_idn,rssi_avgn>) can be obtained based on the received signal. All the positions p are obtained based on the locating fingerprint database, so it is aimed at finding a maximum probability P(p|m), that is, when the signal vector is m, the probability of being located at the position p is the maximum.

$$P(p \mid m) = \frac{P(m \mid p) * P(p)}{P(m)}$$

can be obtained through a Bayesian transformation of the formula. Since in one time of sampling, the probability of obtaining the signal vector m by sampling is a constant, P(p|m)=P(m|p)*P(p). In this scenario, P(m|p) and P(p) are obtained by a data analysis, and then a position corresponding to the maximum possibility of a signal vector can be found.

In another implementation of the present embodiment, the machine learning algorithm is a K Nearest Neighbors (KNN) algorithm, which is a simple machine learning algorithm, and its principle is to calculate the coordinates of an obtainment position based on k positions closest to the obtained signal vector m. In this embodiment, there are two key points: 1) selecting a most suitable k value by using the locating fingerprint database; and 2) calculating a distance between the fingerprints of m and the vector of another position by means of the Euclidean distance, the Manhattan distance or the Chebyshev distance, etc.

Compared with the prior art, the present embodiment has the following advantageous effects.

Based on the electronic shelf label system deployed in the store, the present disclosure constructs a locating fingerprint database including fingerprint data corresponding to each commodity position through the commodity attribute collected by the intelligent device provided on the shopping cart and the shelf label heartbeat signals received by the communication module provided on the shopping cart; and when the shopping cart is located, the collected shelf label heartbeat signals are matched with the locating fingerprint database to locate the shopping cart in real time. Therefore, the present disclosure realizes a fingerprint locating method for the shopping cart based on the electronic shelf label system deployed in the store, reduces the hardware installation complexity of the locating technology, reduces maintenance cost thereof, and improves the locating accuracy and stability, thereby achieving a wide application range.

Embodiment 2

FIG. 6 illustrates a flowchart of a second locating method for a smart shopping cart according to an embodiment of the present disclosure. As illustrated in FIG. 6, before the locating fingerprint database corresponding to the store is constructed, locating the shopping cart further includes the following steps:

Step S201: acquiring, by the server, a shelf serial number and a shelf section index that correspond to each electronic shelf label based on the shelf label IDs in all the shelf label heartbeat signals received within the second preset time window;

Step S202: performing aggregation statistics on the shelf label heartbeat signals on the same shelf section based on the shelf serial number and the shelf section index, to obtain a statistical indicator corresponding to each shelf section;

Step S203: obtaining a target shelf section based on a comprehensive analysis of the statistical indicator corresponding to each shelf section, and taking a coordinate position of the target shelf section as the locating information of the smart shopping cart.

It should be noted that when the shopping cart starts to locate and the construction of the locating fingerprint database is not completely, the intelligent device of the shopping cart may send the heartbeat data received in the latest window to the server, and the server may locate the shopping cart through a special locating process.

One implementation to realize the special locating process in the present embodiment is that the database of the server stores the locating position, the shelf serial number and the shelf section index of each electronic shelf label. The intelligent device of the shopping cart may calculate and determine the current aisle where the shopping cart is currently located based on the heartbeat data collected in a time window. The specific algorithm flow is as follows: (1) data preprocessing: preprocessing the heartbeat data uploaded by the shopping cart, including removing abnormal values, noise and duplicated data, to improve the data quality and accuracy; (2) inquiry about information of the electronic shelf label: inquiring about the shelf serial number and the shelf section index that correspond to the electronic shelf label in the server based on the electronic shelf label ID in the heartbeat data of the shopping cart; (3) aggregation statistics: performing aggregation statistics on the electronic shelf label heartbeat data of the shelves on the same row, based on the searched shelf serial number and shelf section index, and the aggregation statistics includes calculating the statistical indicators such as an average, a harmonic mean, a variance, etc. of the heartbeat data of the shelves on each row, which are used to determine the position information of the shopping cart; (4) aisle determining: weighting and summing the data of the aggregation statistics, and performing a comprehensive analysis in conjunction with the positional relationship between the shelves, to infer an aisle in which the shopping cart is located; the positional relationship between the shelves, such as the relative positions and the arrangement of the shelves, is determined according to the supermarket map and the layout; and the comprehensive analysis includes sorting the statistical indicators of each shelf section, and taking a shelf section with a highest ranking as the target shelf section; (5) return of the locating result: returning the information of the aisle where the shopping cart is currently located, and providing a real-time locating service for the smart shopping cart.

Embodiment 3

FIG. 7 illustrates a flowchart of a third locating method for smart shopping cart according to an embodiment of the present disclosure. As illustrated in FIG. 7, before the locating fingerprint database corresponding to the store is constructed, when the communication module includes a plurality of antennas and the heartbeat data package further includes a preset sequence of signals, the locating of the shopping cart further includes the following steps.

Step S301: calculating an azimuth of a transmit signal source of each electronic shelf label based on baseband signal characteristics of the preset sequence of signals received by each antenna; and Step S302: calculating locating information of the smart shopping cart based on the position information of at least three non-collinear electronic shelf labels and the azimuths corresponding to the at least three non-collinear electronic shelf labels.

Figure 8:
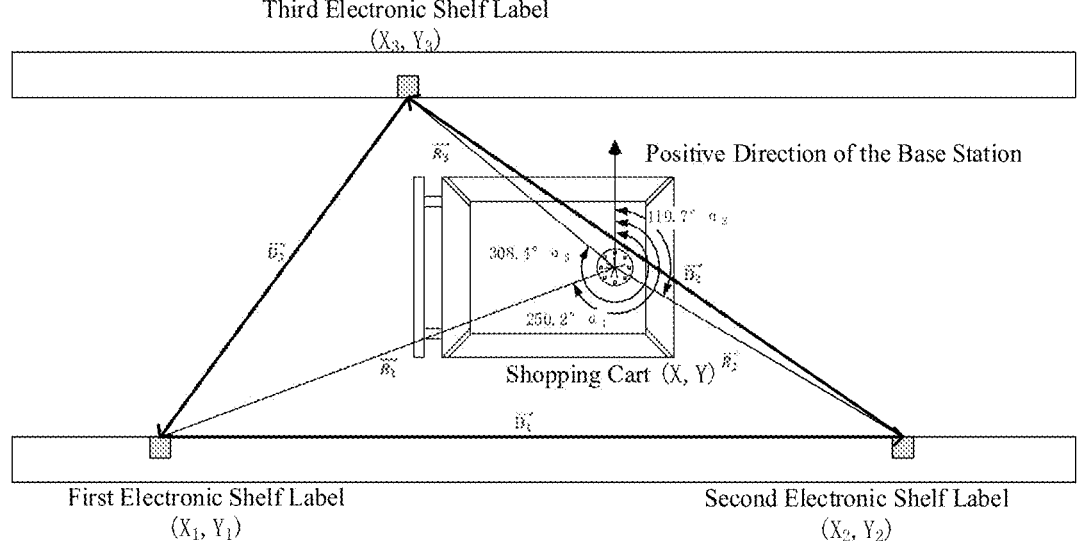
FIG. 8 illustrates a schematic diagram of a relationship between one shopping cart and two electronic shelf labels according to an embodiment of the present disclosure.

It should be noted that each electronic shelf label will send a preset known sequence of signals at the tail of the shelf label heartbeat signal, so that the communication module of the shopping cart can calculate the azimuth upon reception of the known sequence of signals. The communication module with an AOA (Angle of Arrival) locating function on the shopping cart includes an antenna array composed of a plurality of antennas, and the communication module can accurately control the receiving time window of each antenna and calculate the azimuth of the transmit signal source based on the baseband signal characteristics of the signals received through different antennas. No matter which direction the head of the shopping cart faces, the position of the shopping cart can be calculated based on the positions of at least three non-collinear known shelf labels, in which the three non-collinear electronic shelf labels indicate that the positions of the three electronic shelf labels are not in a straight line. As illustrated in FIG. 8, (X, Y) represents locating coordinates of the shopping cart, $(X_1, Y_1)$ represents position coordinates of a first electronic shelf label, $(X_2, Y_2)$ represents position coordinates of a second electronic shelf label, $(X_3, Y_3)$ represents position coordinates of a third electronic shelf label, $\alpha_1$ represents an azimuth of a transmit signal source of the first electronic shelf label, $\alpha_2$ represents an azimuth of a transmit signal source of the second electronic shelf label, $\alpha_3$ represents an azimuth of a transmit signal source of the third electronic shelf label, $\vec{R_1}$ represents a direction vector from the first electronic shelf label to the shopping cart, $\vec{R_2}$ represents a direction vector from the second electronic shelf label to the shopping cart, $\vec{R_3}$ represents a direction vector from the third electronic shelf label to the shopping cart, $\vec{D_1}$ represents a direction vector from the first electronic shelf label to the second electronic shelf label, $\vec{D_2}$ represents a direction vector from the second electronic shelf label to the third electronic shelf label, $\vec{D_3}$ represents a direction vector from the third electronic shelf label to the first electronic shelf label, and the following equations are given:

$$\begin{cases} \|\vec{D_1}\|^2 = \|\vec{R_1}\|^2 + \|\vec{R_2}\|^2 + 2 \times \|\vec{R_1}\| \times \|\vec{R_2}\| \times \cos(\alpha_1 - \alpha_2) \\ \|\vec{D_2}\|^2 = \|\vec{R_2}\|^2 + \|\vec{R_3}\|^2 + 2 \times \|\vec{R_2}\| \times \|\vec{R_3}\| \times \cos(\alpha_2 - \alpha_3) \\ \|\vec{D_3}\|^2 = \|\vec{R_3}\|^2 + \|\vec{R_1}\|^2 + 2 \times \|\vec{R_3}\| \times \|\vec{R_1}\| \times \cos(\alpha_3 - \alpha_1) \end{cases}$$

Since $\alpha_1$, $\alpha_2$, $\alpha_3$, $\|\vec{D_1}\|$, $\|\vec{D_2}\|$ and $\|\vec{D_3}\|$ are known, it is possible to calculate the values of $\|\vec{R_1}\|$, $\|\vec{R_2}\|$ and $\|\vec{R_3}\|$ from the above equations, and then calculate the coordinates of the shopping cart from the following equations:

$$\begin{cases} (X_1 - X)^2 + (Y_1 - Y)^2 = \|\vec{R_1}\|^2 \\ (X_2 - X)^2 + (Y_2 - Y)^2 = \|\vec{R_2}\|^2 \\ (X_3 - X)^2 + (Y_3 - Y)^2 = \|\vec{R_3}\|^2 \end{cases}$$

Figure 9:
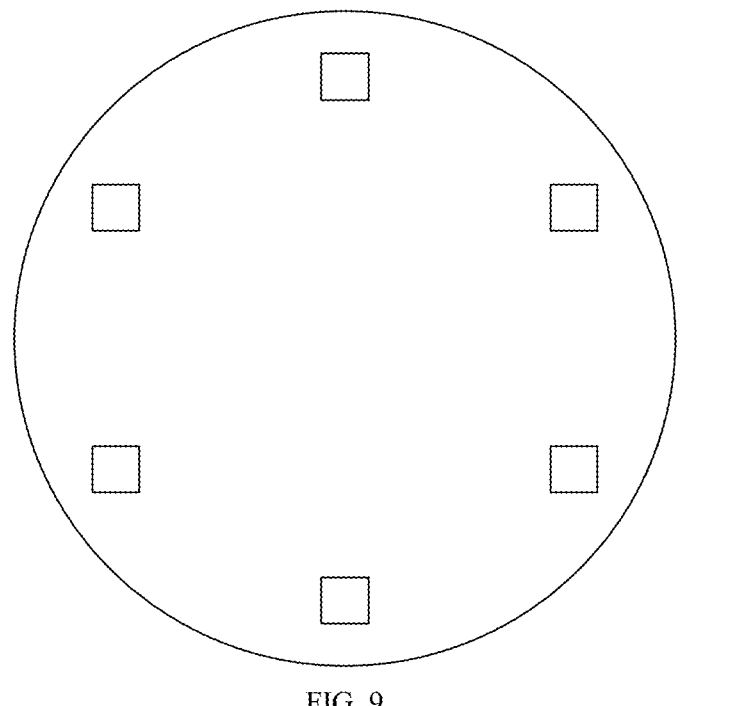
FIG. 9 illustrates a schematic diagram of an antenna array of a 6-antenna version according to an embodiment of the present disclosure.
Figures 10, 11:
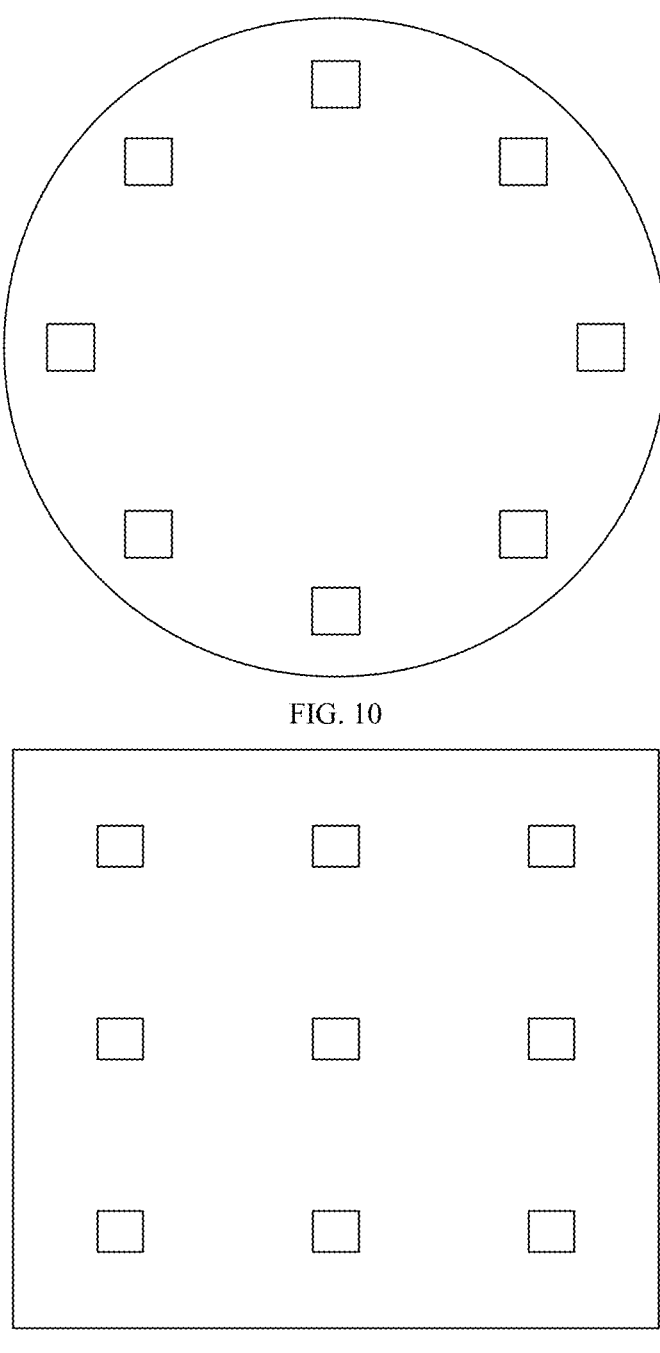
FIG. 10 illustrates a schematic diagram of an antenna array of an 8-antenna version according to an embodiment of the present disclosure.
FIG. 11 illustrates a schematic diagram of an antenna array of a 9-antenna version according to an embodiment of the present disclosure.

It should be noted that the azimuth of a transmit signal source of electronic shelf label is the azimuth of the heartbeat signal of the electronic shelf label received (i.e. an azimuth at which the shelf label heartbeat signals is received), and for the shopping cart located using the AOA, it is also possible to use the heartbeat data collected before and after the locating (in the first preset time window) to update the fingerprint database; and the plurality of antennas included in the communication module include, but are not limited to, an antenna array with a 6-antenna version in FIG. 9, an antenna array with a 8-antenna version in FIG. 10 and an antenna array with a 9-antenna version in FIG. 11.

Embodiment 4

In the present embodiment, when the communication module includes a plurality of antennas and the heartbeat data package further includes a preset sequence of signals, after the server matches all the shelf label heartbeat signals received within the second preset time window with the locating fingerprint database to obtain locating information of the smart shopping cart, the method further includes:

calculating an azimuth of a transmit signal source of each electronic shelf label based on baseband signal characteristics of the preset sequence of signals receive by each antenna; and revising the locating information of the smart shopping cart based on the azimuth to obtain the target locating information of the smart shopping cart.

Figure 12:
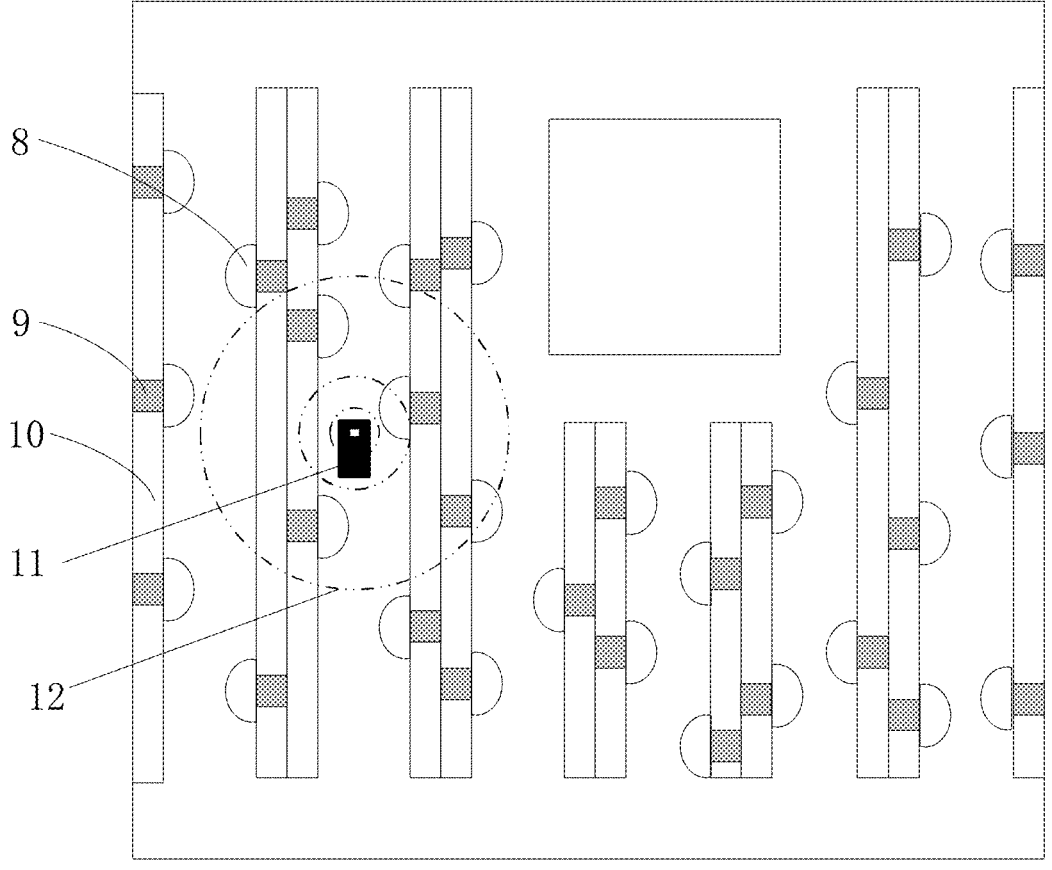
FIG. 12 illustrates a schematic diagram of a shopping cart locating scenario according to an embodiment of the present disclosure.

It should be noted that, as illustrated in FIG. 12, a semi-circular arc denoted by reference numeral 8 indicates a direction in which the heartbeat data package is sent by the electronic shelf label, a gray square denoted by reference numeral 9 indicates an electronic shelf label, a white rectangle denoted by reference numeral 10 indicates a shelf, reference numeral 11 denotes a shopping cart and reference numeral 12 denotes a radiation range of the signals received by the communication module on the shopping cart. The direction in which the electronic shelf label sends the signal is mainly towards the aisle, and it is difficult to penetrate the partition of the shelf. The communication module on the shopping cart can receive the signal sent by the electronic shelf label, and the signal strength is also within a certain range. Therefore, when being in the middle of the aisle, the shopping cart can be located in real time by using the received heartbeat signal of the electronic shelf label.

Figure 13:
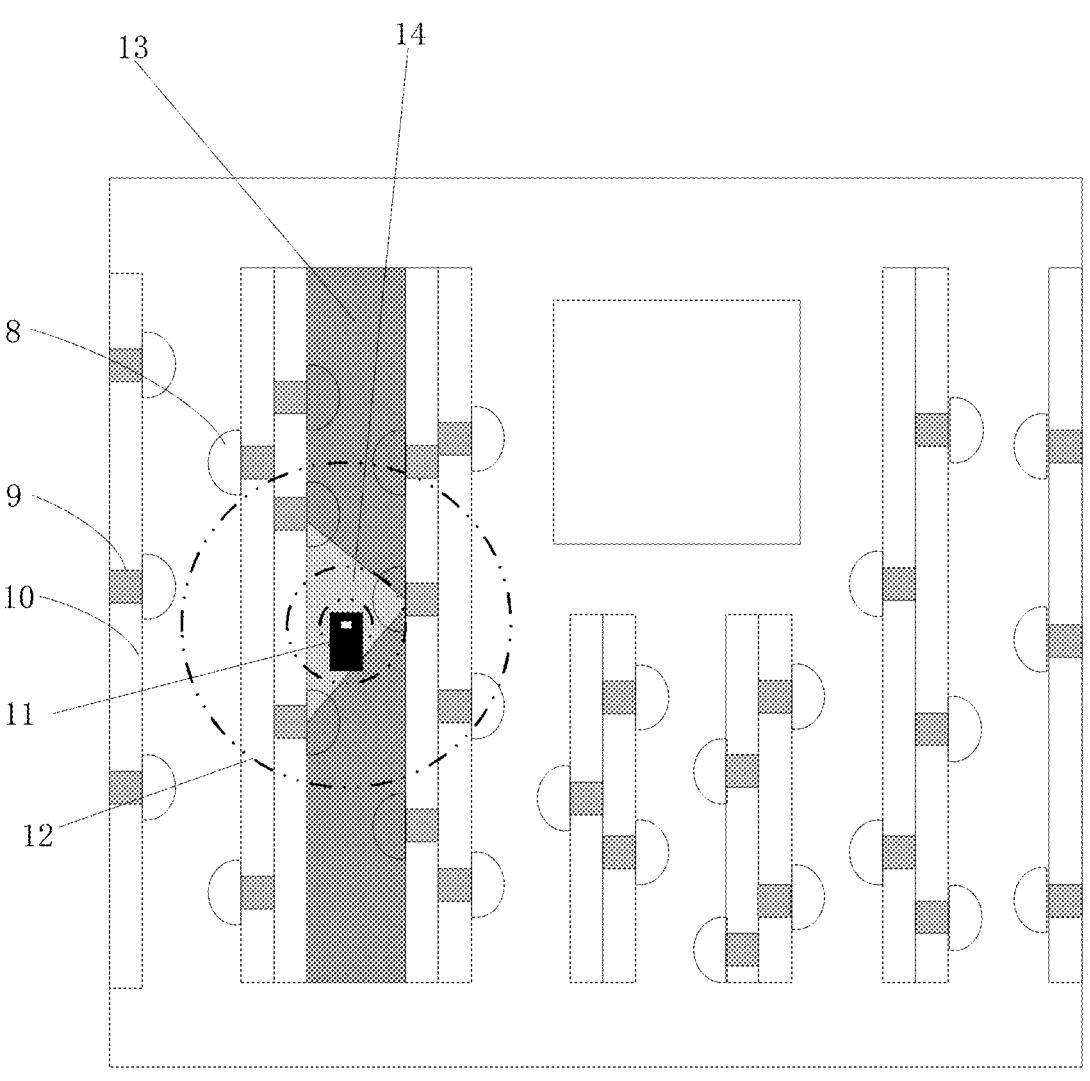
FIG. 13 illustrates a schematic diagram of another shopping cart locating scenario according to an embodiment of the present disclosure.

In the present embodiment, the communication module with the AOA locating function includes an antenna array composed of a plurality of antennas. The communication module can accurately control the receiving time window of each antenna, and calculate the azimuth of the transmit signal source based on the baseband signal characteristics of the signals received by different antennas. By using the azimuth, it is possible to obtain the direction of the shelf label relative to the shopping cart, as illustrated in FIG. 13, and then determine an orientation, a motion direction, etc. of the shopping cart, thereby obtaining more accurate position information of the shopping cart. In FIG. 13, reference numeral 13 denotes an aisle where the shopping cart is located, and reference numeral 14 denotes a locating range of the shopping cart determined based on the azimuth. During locating of the shopping cart, due to the fluctuation of the signal strength, the locating accuracy can only be guaranteed in the aisle, i.e., a gray portion denoted by reference numeral 13; and after the azimuth is included, the shopping cart may be located in a light-gray triangular area denoted by reference numeral 14 by using a positional relationship between the electronic shelf label and the shopping cart, thereby improving the locating accuracy.

Embodiment 5

FIG. 14 illustrates a flowchart of a fourth locating method for smart shopping cart according to an embodiment of the present disclosure. As illustrated in FIG. 14, when the communication module includes a plurality of antennas and the heartbeat data package further includes a preset sequence of signals, the method further includes:

Step S401: sending, when the intelligent device obtains a commodity attribute of any commodity, all shelf label heartbeat signals received by the communication module within a first preset time window, an azimuth at which each of the shelf label heartbeat signals is received, and the commodity attribute to the server in the electronic shelf label system;

Step S402: acquiring, by the server, position information corresponding to the commodity based on the commodity attribute, and obtains position information corresponding to the shelf label based on shelf label IDs in the shelf label heartbeat signals;

Step S403: storing the position information corresponding to the shelf label and the azimuth in an input data set, and storing the position information corresponding to the commodity in an output data set;

Step S404: training a machine learning algorithm with the input data set and the output data set to obtain a shopping cart locating model;

Step S405: inputting shelf label position information and the azimuth both of which correspond to the shelf label heartbeat signal currently receive by the communication module into the shopping cart locating model for identification, to obtain current locating information of the smart shopping cart.

It should be noted that the heartbeat data and the recorded azimuth information both of which are sent to the server by the smart shopping cart may also be used to automatically train the fingerprint matching algorithm in addition to constructing the locating fingerprint database; the fingerprint matching algorithm can be optimized and trained by taking the heartbeat data currently received by the shopping cart and the recorded azimuth information as the input, the matching result as the output, and the position of the commodity as the label. When the shopping cart is real-time located, the shelf label position information and the azimuth are obtained based on the currently received shelf label heartbeat signal, and the shelf label position information and the azimuth are input into the trained fingerprint matching algorithm for identification to obtain the current locating information of the shopping cart.

In a second aspect, the present disclosure provides a locating system for a smart shopping cart, including an electronic shelf label which has known position information, a server and a smart shopping cart, in which the smart shopping cart includes a shopping cart body, a communication module provided on the shopping cart body and configured to receive a heartbeat data package, a motion sensor provided on the shopping cart body and configured to collect motion data and an intelligent device provided on the shopping cart body and configured to collect a commodity attribute;

the electronic shelf label is configured to send a heartbeat data package, in which the heartbeat data package includes a shelf label heartbeat signal;

the communication module is configured to send, when the intelligent device obtains a commodity attribute of any commodity, all the heartbeat data packages received within a first preset time window and the commodity attribute to the server in an electronic shelf label system;

the server is configured to acquire target position information of the commodity based on the commodity attribute, and bind the target position information of the commodity with all the shelf label heartbeat signals received by the communication module within the first preset time window, to serve as fingerprint data corresponding to the target position information; and construct a locating fingerprint database corresponding to a store by acquiring a preset proportion of fingerprint data in the store;

the communication module is further configured to send, when the motion sensor obtains the motion data of the shopping cart body, all the shelf label heartbeat signals received within a second preset time window to the server; and the server is further configured to match all the shelf label heartbeat signals received within the second preset time window with the locating fingerprint database to obtain locating information of the smart shopping cart.

In a third aspect, the present disclosure provides a computer device, which includes a memory, a processor and a computer program stored in the memory and executable in the processor, and when executing the computer program, the processor implements the steps of: sending, when the intelligent device obtains a commodity attribute of any commodity, all heartbeat data packages received by the communication module within a first preset time window, an RSSI value of each of the heartbeat data packages received and the commodity attribute to the server in the electronic shelf label system, and each of the heartbeat data packages includes a shelf label heartbeat signal; acquiring, by the server, target position information of the commodity based on the commodity attribute, and binding the target position information of the commodity with all the shelf label heartbeat signals received by the communication module within the first preset time window and the RSSI value of each of the heartbeat data packages received, to serve as fingerprint data corresponding to the target position information; and constructing a locating fingerprint database corresponding to a store by acquiring a preset proportion of fingerprint data in the store; sending, by the communication module when the motion sensor obtains the motion data of the shopping cart body, all the shelf label heartbeat signals received within a second preset time window to the server; and matching, by the server, all the shelf label heartbeat signals received within the second preset time window with the locating fingerprint database to obtain locating information of the smart shopping cart.

In a fourth aspect, the present disclosure provides a readable storage medium storing a computer program, and when executed by a processor, the computer program implements the steps of: sending, when the intelligent device obtains a commodity attribute of any commodity, all heartbeat data packages received by the communication module within a first preset time window, an RSSI value of each of the heartbeat data packages received and the commodity attribute to the server in the electronic shelf label system, and each of the heartbeat data packages includes a shelf label heartbeat signal; acquiring, by the server, target position information of the commodity based on the commodity attribute, and binding the target position information of the commodity with all the shelf label heartbeat signals received by the communication module within the first preset time window and the RSSI value of each of the heartbeat data packages received, to serve as fingerprint data corresponding to the target position information, and constructing a locating fingerprint database corresponding to a store by acquiring a preset proportion of fingerprint data in the store; sending, by the communication module when the motion sensor obtains the motion data of the shopping cart body, all the shelf label heartbeat signals received within a second preset time window to the server; and matching, by the server, all the shelf label heartbeat signals received within the second preset time window with the locating fingerprint database to obtain locating information of the smart shopping cart.

Those of ordinary skill in the art could understand that all or part of the flows for implementing the methods of the above embodiments may be implemented by instructing related hardware via a computer program. The computer program may be stored in a nonvolatile computer-readable storage medium, and when executed, the computer program may include the flows of the methods of the above embodiments. In this embodiment, any reference to the memory, the storage, the database, or other media used in the embodiments provided in the present disclosure may include a non-volatile and/or volatile memory. The nonvolatile memory may include a read-only memory (ROM), a programmable ROM (PROM), an electrically programmable ROM (EPROM), an electrically erasable programmable ROM (EEPROM) or a flash memory. The volatile memory may include a random-access memory (RAM) or an external cache memory. By way of illustration and not limitation, the RAM is available in various forms, such as a Static RAM (SRAM), a Dynamic RAM (DRAM), a Synchronous DRAM (SDRAM), a Double Data Rate SDRAM (DDRS-DRAM), an Enhanced SDRAM (ESDRAM), a Synchlink DRAM (SLDRAM), a Rambus Direct RAM (RDRAM), a Direct Rambus Dynamic RAM (DRDRAM), and a Rambus Dynamic RAM (RDRAM).

It should be noted that in the present disclosure, relational terms such as "first" and "second" are only used to distinguish one entity or operation from another entity or operation, and do not necessarily require or imply that there is any such actual relationship or order between these entities or operations. Moreover, the term "comprise", "include" or any other variation thereof is intended to cover non-exclusive inclusions, so that a procedure, a method, an article or a device, which includes a series of elements, includes not only those elements, but also other elements not explicitly listed or elements inherent to the procedure, the method, the article or the device. Without further restriction, an element defined by a phrase "comprising a . . . " does not exclude the existence of other identical elements in the procedure, the method, the article or the device including the element.

What is claimed is:

1. A locating method for a smart shopping cart, which is applied to a smart shopping cart in a store having an electronic shelf label system, wherein the electronic shelf label system comprises a server and an electronic shelf label which has known position information and sends a heartbeat data package;

the smart shopping cart comprises a shopping cart body, a communication module provided on the shopping cart body and configured to receive the heartbeat data package, an intelligent device provided on the shopping cart body and configured to collect a commodity attribute, the communication module comprises a plurality of antennas and the heartbeat data package comprises a shelf label heartbeat signal; and the method comprises:

sending, when the intelligent device obtains the commodity attribute of any commodity, all the shelf label heartbeat signals received by the communication module within the first preset time window, an azimuth at which each of the shelf label heartbeat signals is received, and the commodity attribute to the server in the electronic shelf label system;

acquiring, by the server, position information corresponding to the commodity based on the commodity attribute, and obtaining position information corresponding to the shelf label based on shelf label IDs in the shelf label heartbeat signals;

storing the position information corresponding to the shelf label and the azimuth in an input data set, and storing the position information corresponding to the commodity in an output data set; and training a machine learning algorithm with the input data set and the output data set to obtain a shopping cart locating model, to process shelf label position information and the azimuth both of which correspond to the shelf label heartbeat signal received using the shopping cart locating model to obtain the locating information of the smart shopping cart.

2. The locating method for a smart shopping cart according to claim 1, wherein after obtaining the shopping cart locating model, the method further comprises:

inputting shelf label position information and the azimuth both of which correspond to the shelf label heartbeat signal currently received by the communication module into the shopping cart locating model for identification, to obtain current locating information of the smart shopping cart.

3. The locating method for a smart shopping cart according to claim 1, wherein the heartbeat data package further comprises a preset sequence of signals, and the method of calculating the azimuth further comprises:

calculating the azimuth of the heartbeat signal of each electronic shelf label based on baseband signal characteristics of the preset sequence of signals receive by each antenna.

4. The locating method for a smart shopping cart according to claim 1, wherein the heartbeat data package further comprises a preset sequence of signals, and the method further comprises:

calculating the azimuth of the heartbeat signal of each electronic shelf label based on baseband signal characteristics of the preset sequence of signals receive by each antenna; and calculating the locating information of the smart shopping cart based on the position information of at least three non-collinear electronic shelf labels and the azimuths corresponding to the at least three non-collinear electronic shelf labels.

5. The locating method for a smart shopping cart according to claim 4, wherein the calculating the locating information of the smart shopping cart based on the position information of at least three non-collinear electronic shelf labels and the azimuths corresponding to the at least three non-collinear electronic shelf labels comprises:

$$\begin{cases} (X_1 - X)^2 + (Y_1 - Y)^2 = \|\overrightarrow{R_1}\|^2 \\ (X_2 - X)^2 + (Y_2 - Y)^2 = \|\overrightarrow{R_2}\|^2 \\ (X_3 - X)^2 + (Y_3 - Y)^2 = \|\overrightarrow{R_3}\|^2 \end{cases}$$

-continued $$\begin{cases} \|\overrightarrow{D_1}\|^2 = \|\overrightarrow{R_1}\|^2 + \|\overrightarrow{R_2}\|^2 + 2 \times \|\overrightarrow{R_1}\| \times \|\overrightarrow{R_2}\| \times \cos(\alpha_1 - \alpha_2) \\ \|\overrightarrow{D_2}\|^2 = \|\overrightarrow{R_2}\|^2 + \|\overrightarrow{R_3}\|^2 + 2 \times \|\overrightarrow{R_2}\| \times \|\overrightarrow{R_3}\| \times \cos(\alpha_2 - \alpha_3) \\ \|\overrightarrow{D_3}\|^2 = \|\overrightarrow{R_3}\|^2 + \|\overrightarrow{R_1}\|^2 + 2 \times \|\overrightarrow{R_3}\| \times \|\overrightarrow{R_1}\| \times \cos(\alpha_3 - \alpha_1) \end{cases}$$

where (X, Y) represents locating coordinates of the shopping cart, $(X_1, Y_1)$ represents position coordinates of a first electronic shelf label, $(X_2, Y_2)$ represents position coordinates of a second electronic shelf label, $(X_3, Y_3)$ represents position coordinates of a third electronic shelf label, $\alpha_1$ represents an azimuth of a heartbeat signal of the first electronic shelf label, $\alpha_2$ represents an azimuth of a heartbeat signal of the second electronic shelf label, $\alpha_3$ represents an azimuth of a heartbeat signal of the third electronic shelf label, $\overrightarrow{R_1}$ represents a direction vector from the first electronic shelf label to the shopping cart, $\overrightarrow{R_2}$ represents a direction vector from the second electronic shelf label to the shopping cart, $\overrightarrow{R_3}$ represents a direction vector from the third electronic shelf label to the shopping cart, $\overrightarrow{D_1}$ represents a direction vector from the first electronic shelf label to the second electronic shelf label, $\overrightarrow{D_2}$ represents a direction vector from the second electronic shelf label to the third electronic shelf label, $\overrightarrow{D_3}$ represents a direction vector from the third electronic shelf label to the first electronic shelf label.

6. The locating method for a smart shopping cart according to claim 1, wherein the smart shopping cart further comprises a motion sensor which is provided on the shopping cart body and configured to collect motion data, and before obtaining the shopping cart locating model, the method further comprises:

acquiring, by the server, a shelf serial number and a shelf section index that correspond to each electronic shelf label based on shelf label IDs in all the shelf label heartbeat signals received within the second preset time window, wherein the second preset time window=T4, where T4 is a duration before the motion sensor obtains the motion data;

performing aggregation statistics on the shelf label heartbeat signals on the same shelf section based on the shelf serial number and the shelf section index, to obtain a statistical indicator corresponding to each shelf section; and obtaining a target shelf section based on a comprehensive analysis of the statistical indicator corresponding to each shelf section, and taking a coordinate position of the target shelf section as the locating information of the smart shopping cart.

7. The locating method for a smart shopping cart according to claim 6, wherein the first preset time window=T1+T2+T3, where T1 is a duration before the intelligent device obtains the commodity attribute, T2 is a duration after the intelligent device obtains the commodity attribute and before the shopping cart starts to move, and T3 is a duration after the shopping cart starts to move.

8. The locating method for a smart shopping cart according to claim 1, wherein the acquiring, by the server, target position information of the commodity based on the commodity attribute comprises:

if the server acquires a plurality of position information based on the commodity attribute, filtering the plurality of position information based on the locating information of the shopping cart at a previous moment to obtain the target position information of the commodity.

9. The locating method for a smart shopping cart according to claim 1, wherein the method further comprises:

sending, when the intelligent device obtains a commodity attribute of any commodity, all heartbeat data packages received by the communication module within a first preset time window, an RSSI value of each of the heartbeat data packages received and the commodity attribute to the server in the electronic shelf label system, wherein each of the heartbeat data packages comprises a shelf label heartbeat signal;

acquiring, by the server, target position information of the commodity based on the commodity attribute, and binding, by the server, the target position information of the commodity with all the shelf label heartbeat signals received by the communication module within the first preset time window and the RSSI value of each of the heartbeat data packages received, to serve as fingerprint data corresponding to the target position information; and constructing a locating fingerprint database corresponding to a store by acquiring a preset proportion of fingerprint data in the store, to match the shelf label heartbeat signal received on the fingerprint database to obtain the locating information of the smart shopping cart.

10. The locating method for a smart shopping cart according to claim 9, wherein the smart shopping cart further comprises a motion sensor which is provided on the shopping cart body and configured to collect motion data, and after constructing a locating fingerprint database corresponding to a store, the method further comprises:

sending, by the communication module when the motion sensor obtains motion data of the shopping cart body, all the shelf label heartbeat signals received within a second preset time window to the server, wherein the second preset time window=T4, where T4 is a duration before the motion sensor obtains the motion data; and matching, by the server, all the shelf label heartbeat signals received within the second preset time window with the locating fingerprint database to obtain locating information of the smart shopping cart.

11. The locating method for a smart shopping cart according to claim 9, wherein the shelf label heartbeat signal comprises a shelf label ID and a report time; and the fingerprint data corresponding to the target position information comprises a plurality of shelf label IDs and an RSSI weighted average corresponding to each shelf label ID.

12. The locating method for a smart shopping cart according to claim 9, wherein after constructing a locating fingerprint database corresponding to a store, the method further comprises:

acquiring fingerprint data corresponding to a position of the commodity when the intelligent device continues to obtain the commodity attribute; and updating the locating fingerprint database with the fingerprint data corresponding to the position of the commodity.

13. A locating system for a smart shopping cart, comprising an electronic shelf label which has known position information, a server and a smart shopping cart, wherein the smart shopping cart comprises a shopping cart body, a communication module provided on the shopping cart body and configured to receive a heartbeat data package, and an intelligent device provided on the shopping cart body and configured to collect a commodity attribute, wherein the communication module comprises a plurality of antennas and the heartbeat data package comprises a shelf label heartbeat signal;

the electronic shelf label is configured to send a heartbeat data package;

the communication module is configured to, when the intelligent device obtains the commodity attribute of any commodity, send all the shelf label heartbeat signals received by the communication module within the first preset time window, an azimuth at which each of the shelf label heartbeat signals is received, and the commodity attribute to the server in the electronic shelf label system;

the server is configured to acquire position information corresponding to the commodity based on the commodity attribute, and obtain position information corresponding to the shelf label based on shelf label IDs in the shelf label heartbeat signals;

the server is configured to store the position information corresponding to the shelf label and the azimuth in an input data set, and store the position information corresponding to the commodity in an output data set;

the server is configured to train a machine learning algorithm with the input data set and the output data set to obtain a shopping cart locating model, to process shelf label position information and the azimuth both of which correspond to the shelf label heartbeat signal received using the shopping cart locating model to obtain the locating information of the smart shopping cart.

14. The locating system for a smart shopping cart according to claim 13, wherein the locating system further comprises:

the server is configured to input shelf label position information and the azimuth both of which correspond to the shelf label heartbeat signal currently receive by the communication module into the shopping cart locating model for identification, to obtain current locating information of the smart shopping cart.

15. The locating system for a smart shopping cart according to claim 13, wherein the heartbeat data package further comprises a preset sequence of signals, and the locating system further comprises:

the communication module further configured to calculate the azimuth of heartbeat signal of each electronic shelf label based on baseband signal characteristics of the preset sequence of signals received by each antenna.

16. The locating system for a smart shopping cart according to claim 13, wherein the heartbeat data package further comprises a preset sequence of signals, and the locating system further comprises:

the communication module further configured to calculate the azimuth of heartbeat signal of each electronic shelf label based on baseband signal characteristics of the preset sequence of signals received by each antenna; and the server further configured to calculate the locating information of the smart shopping cart based on the position information of at least three non-collinear electronic shelf labels and the azimuths corresponding to the at least three non-collinear electronic shelf labels.

17. The locating system for a smart shopping cart according to claim 13, wherein the server further configured to:

acquire a shelf serial number and a shelf section index that correspond to each electronic shelf label based on shelf label IDs in all the shelf label heartbeat signals received within the second preset time window, wherein the second preset time window=T4, where T4 is a duration before the motion sensor obtains the motion data;

perform aggregation statistics on the shelf label heartbeat signals on the same shelf section based on the shelf serial number and the shelf section index, to obtain a statistical indicator corresponding to each shelf section; and obtain a target shelf section based on a comprehensive analysis of the statistical indicator corresponding to each shelf section, and taking a coordinate position of the target shelf section as the locating information of the smart shopping cart.

18. The locating system for a smart shopping cart according to claim 13, wherein the locating system further comprises:

the communication module is further configured to send, when the intelligent device obtains a commodity attribute of any commodity, all the heartbeat data packages received within a first preset time window and the commodity attribute to the server in an electronic shelf label system;

the server is further configured to acquire target position information of the commodity based on the commodity attribute, and bind the target position information of the commodity with all the shelf label heartbeat signals received by the communication module within the first preset time window, to serve as fingerprint data corresponding to the target position information, and construct a locating fingerprint database corresponding to a store by acquiring a preset proportion of fingerprint data in the store, to match the shelf label heartbeat signal received on the fingerprint database to obtain the locating information of the smart shopping cart.

19. The locating system for a smart shopping cart according to claim 18, wherein the smart shopping cart further comprises a motion sensor which is provided on the shopping cart body and configured to collect motion data, and the locating system further comprises:

the communication module is further configured to send, when the motion sensor obtains the motion data of the shopping cart body, all the shelf label heartbeat signals received within a second preset time window to the server, wherein the second preset time window=T4, where T4 is a duration before the motion sensor obtains the motion data; and the server is further configured to match all the shelf label heartbeat signals received within the second preset time window with the locating fingerprint database to obtain locating information of the smart shopping cart.

20. A computer device comprising a memory, a processor and a computer program stored in the memory and executable on the processor, wherein when executing the computer program, the processor implements the steps of a method, the method is applied to a smart shopping cart in a store having an electronic shelf label system, wherein the electronic shelf label system comprises a server and an electronic shelf label which has known position information and sends a heartbeat data package;

the smart shopping cart comprises a shopping cart body, a communication module provided on the shopping cart body and configured to receive the heartbeat data package, an intelligent device provided on the shopping cart body and configured to collect a commodity attribute, the communication module comprises a plurality of antennas and the heartbeat data package comprises a shelf label heartbeat signal; and the method comprises:

sending, when the intelligent device obtains the commodity attribute of any commodity, all the shelf label heartbeat signals received by the communication module within the first preset time window, an azimuth at which each of the shelf label heartbeat signals is received, and the commodity attribute to the server in the electronic shelf label system;

acquiring, by the server, position information corresponding to the commodity based on the commodity attribute, and obtaining position information corresponding to the shelf label based on shelf label IDs in the shelf label heartbeat signals;

storing the position information corresponding to the shelf label and the azimuth in an input data set, and storing the position information corresponding to the commodity in an output data set; and training a machine learning algorithm with the input data set and the output data set to obtain a shopping cart locating model, to process shelf label position information and the azimuth both of which correspond to the shelf label heartbeat signal received using the shopping cart locating model to obtain the locating information of the smart shopping cart.

*   *   *   *   *